United States Patent
Hamada et al.

(10) Patent No.: US 10,486,750 B2
(45) Date of Patent: Nov. 26, 2019

(54) STEEL SHEET MEMBER COMBINATION STRUCTURE, AUTOMOTIVE STRUCTURAL MEMBER, CENTER PILLAR, BUMPER, AND DOOR BEAM

(71) Applicant: NIPPON STEEL & SUMITOMO METAL CORPORATION, Tokyo (JP)

(72) Inventors: Koichi Hamada, Tokyo (JP); Atsushi Ono, Tokyo (JP); Yasunori Ito, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 15/752,965

(22) PCT Filed: Aug. 19, 2016

(86) PCT No.: PCT/JP2016/074241
§ 371 (c)(1),
(2) Date: Feb. 15, 2018

(87) PCT Pub. No.: WO2017/030191
PCT Pub. Date: Feb. 23, 2017

(65) Prior Publication Data
US 2018/0251160 A1    Sep. 6, 2018

(30) Foreign Application Priority Data

Aug. 20, 2015 (JP) .................................. 2015-163063

(51) Int. Cl.
*B60J 7/00* (2006.01)
*B62D 25/04* (2006.01)
(Continued)

(52) U.S. Cl.
CPC ............ *B62D 25/04* (2013.01); *B60J 5/0443* (2013.01); *B60R 19/18* (2013.01); *B60R 2019/1813* (2013.01)

(58) Field of Classification Search
CPC ..... B62D 25/04; C04B 24/2641; C04B 28/34; C04B 35/565; C04B 38/0006; B29C 65/00; H01L 2924/00014; H01L 2224/48091
(Continued)

(56) References Cited

U.S. PATENT DOCUMENTS

| 4,018,466 A | 4/1977 | Norlin |
| 5,246,264 A * | 9/1993 | Yoshii .................... B62D 25/04 296/1.03 |

(Continued)

FOREIGN PATENT DOCUMENTS

| CN | 204527083 U | 8/2005 |
| CN | 204488672 U | 7/2015 |

(Continued)

OTHER PUBLICATIONS

Russian Decision to Grant and Seach Report for counterpart Russian Application No. 2018107069/11, dated Nov. 15, 2018, with English translation.

(Continued)

*Primary Examiner* — Kiran B Patel
(74) *Attorney, Agent, or Firm* — Birch, Stewart, Kolasch & Birch, LLP

(57) ABSTRACT

A steel sheet member combination structure includes: a first steel sheet member having a main wall portion, a standing wall portion that stands from an end edge of the main wall portion, and a flange portion that extends parallel to the main wall portion from an end edge of the standing wall portion; and a second steel sheet member having a horizontal wall (Continued)

portion that is joined to at least one of an inner surface or an outer surface of the first steel sheet member and that abuts the main wall portion and a side wall portion that abuts the standing wall portion, and the first steel sheet member and the second steel sheet member satisfy predetermined relational expressions.

20 Claims, 12 Drawing Sheets

(51) Int. Cl.
  B60R 19/18 (2006.01)
  B60J 5/04 (2006.01)
(58) Field of Classification Search
  USPC ................................................ 296/193.01
  See application file for complete search history.

(56) References Cited

U.S. PATENT DOCUMENTS

| | | | | |
|---|---|---|---|---|
| 5,941,597 | A * | 8/1999 | Horiuchi | B62D 25/04 |
| | | | | 296/193.06 |
| 6,595,579 | B2 * | 7/2003 | Freitag | B62D 25/04 |
| | | | | 296/187.12 |
| 6,692,065 | B2 * | 2/2004 | Yamamoto | B62D 25/02 |
| | | | | 296/146.9 |
| 7,152,914 | B2 * | 12/2006 | Dingman | B62D 25/04 |
| | | | | 296/193.05 |
| 7,357,448 | B2 * | 4/2008 | Chen | B62D 25/04 |
| | | | | 296/187.12 |
| 7,815,247 | B2 * | 10/2010 | Obayashi | B62D 25/04 |
| | | | | 296/193.06 |
| 7,828,357 | B2 * | 11/2010 | Hayashi | B23K 11/115 |
| | | | | 296/29 |
| 7,959,217 | B2 * | 6/2011 | Onuma | B62D 25/04 |
| | | | | 296/146.11 |
| 8,491,046 | B2 * | 7/2013 | Nagai | B62D 25/02 |
| | | | | 296/146.6 |
| 8,998,296 | B2 | 4/2015 | Eipper | |
| 9,616,935 | B2 * | 4/2017 | Schnug | B62D 25/04 |
| 9,630,651 | B1 * | 4/2017 | Baccouche | B62D 29/005 |
| 9,764,766 | B2 * | 9/2017 | Yoshida | B62D 21/157 |
| 9,868,470 | B2 * | 1/2018 | Emura | B62D 25/04 |
| 10,059,375 | B2 * | 8/2018 | Emura | B62D 21/157 |
| 10,059,376 | B2 * | 8/2018 | Heitkamp | B62D 25/04 |
| 10,086,876 | B2 * | 10/2018 | Lange | B62D 25/02 |
| 2008/0001434 | A1 * | 1/2008 | Henkelmann | B62D 25/04 |
| | | | | 296/187.12 |
| 2009/0085379 | A1 * | 4/2009 | Takahashi | B62D 25/04 |
| | | | | 296/193.06 |
| 2010/0098969 | A1 * | 4/2010 | Hashimura | B21J 15/025 |
| | | | | 428/653 |
| 2010/0308623 | A1 | 12/2010 | Bodin et al. | |
| 2011/0210581 | A1 * | 9/2011 | Kunishi | B62D 21/157 |
| | | | | 296/193.01 |
| 2013/0017406 | A1 | 1/2013 | Kinefuchi et al. | |
| 2013/0069395 | A1 * | 3/2013 | Nusier | B62D 25/06 |
| | | | | 296/203.03 |
| 2013/0113237 | A1 * | 5/2013 | Huhn | B21D 53/88 |
| | | | | 296/193.05 |
| 2013/0187410 | A1 * | 7/2013 | Wawers | B62D 21/157 |
| | | | | 296/193.06 |
| 2014/0028056 | A1 * | 1/2014 | Nishimura | B62D 25/04 |
| | | | | 296/193.06 |
| 2014/0145469 | A1 * | 5/2014 | Mildner | B62D 29/005 |
| | | | | 296/193.06 |
| 2016/0280270 | A1 * | 9/2016 | Valencia Carrio | B62D 25/025 |
| 2017/0066481 | A1 * | 3/2017 | Bodin | B21D 53/88 |
| 2017/0209909 | A1 * | 7/2017 | Kavik | B21D 53/88 |
| 2018/0304341 | A1 * | 10/2018 | Frost | B21D 22/26 |
| 2019/0077239 | A1 * | 3/2019 | Ertl | B60R 13/04 |
| 2019/0106155 | A1 * | 4/2019 | Singh | B29C 71/02 |

FOREIGN PATENT DOCUMENTS

| | | |
|---|---|---|
| CN | 104832056 A | 8/2015 |
| CN | 204527333 U | 8/2015 |
| DE | 10135903 A1 | 2/2003 |
| DE | 102013011679 A1 | 1/2014 |
| EP | 1118528 A2 | 7/2001 |
| JP | 3173539 B2 | 6/2001 |
| JP | 2007-308114 A | 11/2007 |
| JP | 2008-230453 A | 10/2008 |
| JP | 2010-95176 A | 4/2010 |
| JP | 2011-207330 A | 10/2011 |
| RU | 2478511 C2 | 4/2013 |
| WO | WO 99/20516 A1 | 4/1999 |

OTHER PUBLICATIONS

International Search Report for PCT/JP2016/074241 dated Sep. 20, 2016.
Written Opinion of the International Searching Authority for PCT/JP2016/074241 (PCT/ISA/237) dated Sep. 20, 2016.
Extended European Search Report for counterpart European Application No. 16837180.5, dated Mar. 8, 2019.
Chinese Office Action and Search Report, dated Jul. 22, 2019, for corresponding Chinese Application No. 201680046964.7, with an English translation.

* cited by examiner

OUTSIDE

INSIDE

STEEL SHEET MEMBER COMBINATION STRUCTURE, AUTOMOTIVE STRUCTURAL MEMBER, CENTER PILLAR, BUMPER, AND DOOR BEAM

TECHNICAL FIELD OF THE INVENTION

The present invention relates to a steel sheet member combination structure, an automotive structural member, a center pillar, a bumper, and a door beam.

The present application claims priority on the basis of Japanese Patent Application No. 2015-163063 filed on Aug. 20, 2015, the content of which is incorporated herein by reference.

RELATED ART

Structural members constituting automotive bodies play a role of limiting the effect, on the inside of cabins, of impact in cases in which an automobile collides with an oncoming vehicle or an obstacle, an automobile is hit from a side of a vehicle body, or the like. For example, as shown in FIG. 17A and FIG. 17B, when an impactor 5 collides with a lower portion of a center pillar 1 which is one of structural members constituting an automotive body from a side of a vehicle body, and thus the center pillar receives a load, the lower portion of the center pillar 1 deforms so as to collapse toward the inside of the vehicle body in the width direction. Then, due to this deformation, the center pillar 1 absorbs collision energy from the impactor 5 and suppresses an upper portion of the center pillar 1 coming inside a cabin, thereby securing the safety of a passenger P.

However, in a case in which the center pillar 1 is broken before the load from the impactor 5 is sufficiently sustained, the collision energy from the impactor 5 cannot be sufficiently absorbed, and consequently, the upper portion of the center pillar 1 comes inside the cabin as shown in FIG. 17A. In order to prevent the breakage or the like of the center pillar 1 so as to increase the energy absorption amount, an increase in the sheet thickness of the center pillar 1 can be considered, but an increase in the sheet thickness leads to an increase in the vehicle weight. Therefore, it becomes important to improve the energy absorption efficiency (energy absorption amount per unit weight) when there is collision.

Patent Document 1 discloses a technique in which a foamed material is provided in a center pillar, thereby increasing the initial reactive force to collision from a side of a vehicle body, suppressing the deformation of the center pillar coming inside a cabin due to collision, and improving the safety of passengers in the cabin.

In addition, Patent Document 2 and Patent Document 3 disclose techniques in which a vulnerable portion such as a hole or a recess bead is formed in a lower portion of a center pillar, thereby inducing deformation due to collision mainly in a lower side portion of a vehicle body, suppressing the deformation coming inside a cabin, and improving the safety of passengers in the cabin.

CITATION LIST

Patent Documents

[Patent Document 1] Japanese Unexamined Patent Application, First Publication No. 2007-308114
[Patent Document 2] Japanese Patent No. 3173539
[Patent Document 3] Japanese Unexamined Patent Application, First Publication No. 2010-095176

DISCLOSURE OF THE INVENTION

Problems to be Solved by the Invention

However, in Patent Document 1, raw materials and manufacturing steps become complex, and thus manufacturing costs increase, and the energy absorption amount by the foamed material cannot be said to be sufficient. As a result, in order to improve the energy absorption efficiency in Patent Document 1, a large amount of a foamed material becomes necessary, and the manufacturing costs significantly increase.

In addition, in Patent Document 2 and Patent Document 3, there is a possibility that the vulnerable portion such as a hole may break during collision, and there is a possibility that deformation may concentrate in the vulnerable portion and thus cause local deformation. Therefore, in Patent Document 2 and Patent Document 3, the amount of absorbable energy becomes small, and consequently, it is difficult to improve the energy absorption efficiency.

The present invention has been made in consideration of the above-described circumstances, and an object of the present invention is to provide a steel sheet member combination structure, an automotive structural member, a center pillar, a bumper, and a door beam which are capable of improving the collision energy absorption efficiency at low costs.

Means for Solving the Problem

In order to achieve the above-described object, the present invention employs the followings.

(1) A steel sheet member combination structure according to a first aspect of the present invention includes a first steel sheet member having a main wall portion, a standing wall portion that stands from an end edge of the main wall portion, and a flange portion that extends parallel to the main wall portion from an end edge of the standing wall portion; and a second steel sheet member that is joined to at least one of an inner surface or an outer surface of the first steel sheet member and has a horizontal wall portion that abuts the main wall portion and a side wall portion that abuts the standing wall portion, in which, when larger one of a distance between an outer surface of the flange portion and an outer surface of the main wall portion and a distance between the outer surface of the flange portion and an outer surface of the horizontal wall portion is defined as H (mm), a sum of a sheet thickness of the standing wall portion and a sheet thickness of the side wall portion is defined as t (mm), and larger one of a distance between a tip end surface of the side wall portion and the outer surface of the main wall portion and a distance between the tip end surface of the side wall portion and the outer surface of the horizontal wall portion is defined as H1 (mm), the first steel sheet member and the second steel sheet member satisfy Expression (a) and Expression (b).

$$(H/t) \leq 20.0 \quad \text{Expression (a)}$$

$$0.6 \leq (H1/H) \leq 1.0 \quad \text{Expression (b)}$$

(2) In the aspect according to (1), the steel sheet member combination structure may further include a first joint portion that joins the standing wall portion of the first steel sheet member and the side wall portion of the second steel sheet member.

(3) In the aspect according to (1) or (2), the steel sheet member combination structure may further include a second joint portion that joins the main wall portion of the first steel sheet member and the horizontal wall portion of the second steel sheet member.

(4) In the aspect according to any one of (1) to (3), the second steel sheet member may be a steel sheet having a tensile strength of 980 MPa or higher.

(5) In the aspect according to (4), the first steel sheet member may be a steel sheet having a tensile strength of 980 MPa or higher.

(6) An automotive structural member according to a second aspect of the present invention includes the steel sheet member combination structure according to any one of (1) to (5).

(7) A center pillar according to a third aspect of the present invention is a center pillar having the steel sheet member combination structure according to any one of (1) to (5), the center pillar including a center pillar inner; a center pillar outer that is constituted of the first steel sheet member of the steel sheet member combination structure and that is joined to the center pillar inner; and a patch member that is constituted of the second steel sheet member of the steel sheet member combination structure and that is joined to at least one of an inner surface or an outer surface of the center pillar outer.

(8) A bumper according to a fourth aspect of the present invention is a bumper having the steel sheet member combination structure according to any one of (1) to (5), the bumper including a baseplate; a bumper main body that is constituted of the first steel sheet member of the steel sheet member combination structure and that is joined to the baseplate; and a patch member that is constituted of the second steel sheet member of the steel sheet member combination structure and that is joined to at least one of an inner surface or an outer surface of the bumper main body.

(9) A door beam according to a fifth aspect of the present invention is a door beam having the steel sheet member combination structure according to any one of (1) to (5), the door beam including a door beam main body constituted of the first steel sheet member of the steel sheet member combination structure; and a patch member that is constituted of the second steel sheet member of the steel sheet member combination structure and that is joined to at least one of an inner surface or an outer surface of the door beam main body.

Effects of the Invention

According to the respective aspects of the present invention, it is possible to improve the collision energy absorption efficiency at low costs.

EMBODIMENTS OF THE INVENTION

Hereinafter, individual embodiments of the present invention will be described in detail with reference to drawings. In the present specification and the drawings, constituent elements having substantially the same functional constitution will be given the same reference symbol and the description thereof will not be repeated.

(First Embodiment)

Figure 1A:
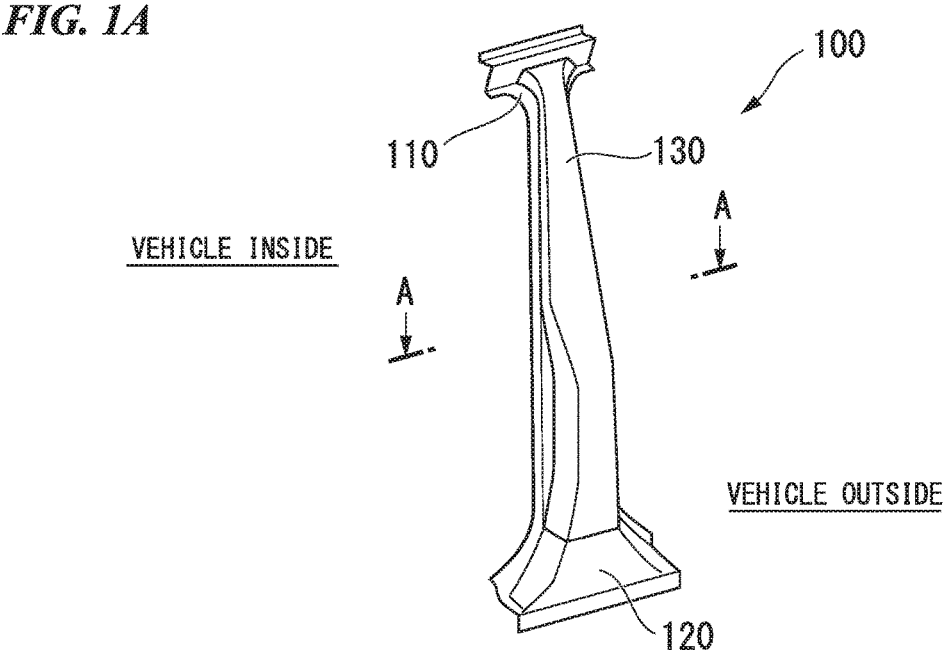
FIG. 1A is a schematic perspective view showing a center pillar according to a first embodiment of the present invention wherein the center pillar includes a first steel sheet member and a second steel sheet member.
Figure 1B:
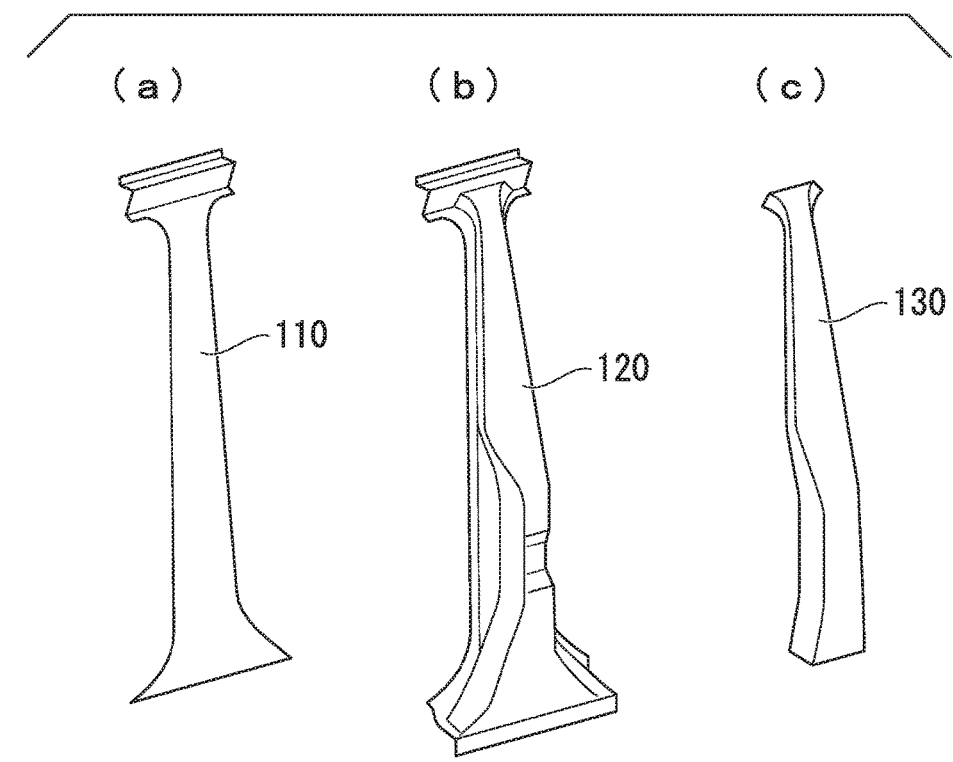
FIG. 1B is an exploded perspective view of the center pillar, (a) is a view showing a center pillar inner of the center pillar, (b) is a view showing a state in which a center pillar outer is joined to the center pillar inner, and (c) is a view showing a patch member that is joined to the center pillar outer.

FIG. 1A is a schematic perspective view showing a center pillar 100 (automotive structural member) according to a first embodiment of the present invention. In addition, FIG. 1B is an exploded perspective view of the center pillar 100, (a) is a view showing a center pillar inner 110, (b) is a view showing a state in which a center pillar outer 120 is joined to the center pillar inner 110, and (c) is a view showing a patch member 130 that is joined to the center pillar outer 120. In addition, FIG. 2 is a cross-sectional view in a direction of the A-A line in FIG. 1A.

As shown in FIG. 1A and FIG. 1B, the center pillar 100 is long in one direction and includes the center pillar inner 110, the center pillar outer 120 (first steel sheet member) joined to the center pillar inner 110, and the patch member 130 (second steel sheet member) joined to the center pillar outer 120. In addition, the center pillar 100 is disposed on a side of an automotive body in the vertical direction.

Figure 2:
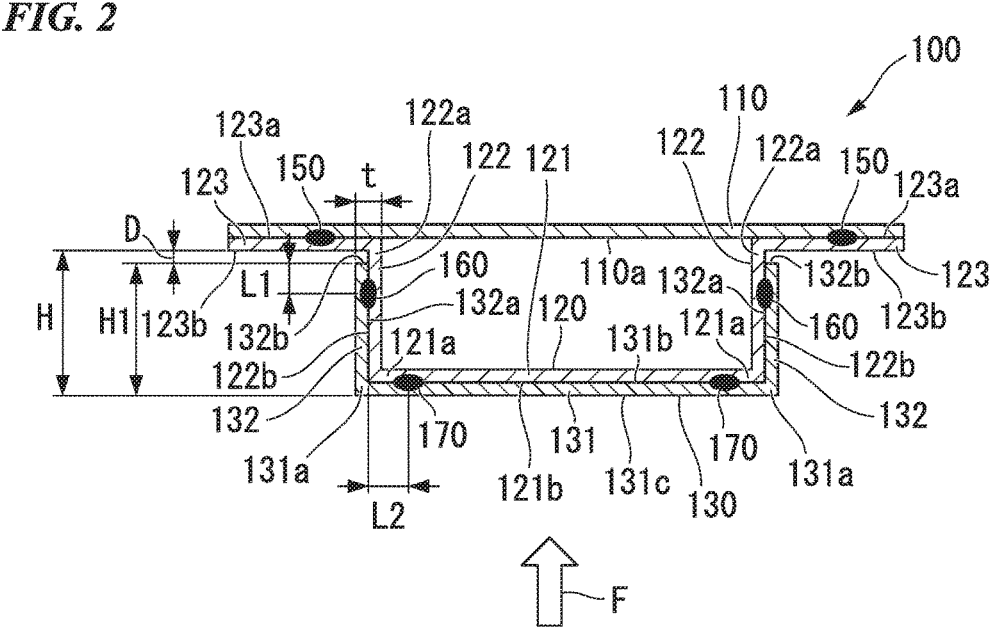
FIG. 2 is a cross-sectional view in a direction of an A-A line in FIG. 1A.

In addition, as shown in FIG. 2, a cross-section of the center pillar 100 which is perpendicular to the longitudinal direction is a hollow cross-section, and, when an impact F is exerted from a side of a vehicle body, the center pillar receives a load from the impact F, bending-deforms, and absorbs collision energy.

As shown in FIG. 2, the center pillar inner 110 of the center pillar 100 has a flat sheet shape. In addition, the center pillar inner 110 is a steel sheet having, for example, a sheet thickness of 0.6 to 1.6 mm and a tensile strength of 980 MPa or higher.

Meanwhile, as the center pillar inner 110, a steel sheet having a tensile strength of 1,180 MPa or higher is more preferably used.

The center pillar outer 120 of the center pillar 100 is a steel sheet having a sheet thickness of 0.8 to 2.0 mm and a tensile strength of 980 MPa or higher. In addition, as shown in FIG. 2, the center pillar outer 120 has a hat-like cross-section which is perpendicular to the longitudinal direction and includes a main wall portion 121 facing the center pillar inner 110, a pair of standing wall portions 122 that vertically stands from both ends 121a (both end edges) of the main wall portion 121, and a pair of flange portions 123 that is parallel to the main wall portion 121 and extends from one end 122a (end edge) of each of the standing wall portions 122 so as to separate from the main wall portion 121.

Meanwhile, as the center pillar outer 120, a steel sheet having a tensile strength of 1,180 MPa or higher is more preferably used.

In addition, as shown in FIG. 2, the center pillar outer 120 is joined to an outer surface 110a (a surface toward the outside of the vehicle body) of the center pillar inner 110 by spot-welding the flange portions 123. In other words, spot-welding portions 150 are provided between the outer surface 110a of the center pillar inner 110 and inner surfaces 123a of the flange portions 123 of the center pillar outer 120. Meanwhile, the center pillar inner 110 and the flange portions 123 of the center pillar outer 120 may be joined together by means of, for example, laser welding, brazing, or the like instead of spot welding.

In addition, the patch member 130 of the center pillar 100 is a steel sheet having a sheet thickness of 0.8 to 3.0 mm and a tensile strength of 980 MPa or higher. In addition, as shown in FIG. 2, the patch member 130 has a channel-like cross-sectional shape and includes a horizontal wall portion 131 and a pair of side wall portions 132 that vertically stands from both ends 131a (both end edges) of the horizontal wall portion 131.

In addition, the patch member 130 is joined to an outer surface of the center pillar outer 120 by spot-welding the side wall portions 132 and the standing wall portions 122 of the center pillar outer 120 and spot-welding the horizontal wall portion 131 and the main wall portion 121 of the center pillar outer 120. In other words, spot-welding portions 160 (first joint portions) are formed between outer surfaces 122b of the standing wall portions 122 of the center pillar outer 120 and inner surfaces 132a of the side wall portions 132 of the patch member 130, and spot-welding portions 170 (second joint portions) are formed between an outer surface 121b of the main wall portion 121 of the center pillar outer 120 and an inner surface 131b of the horizontal wall portion 131 of the patch member 130. Meanwhile, the center pillar outer 120 and the patch member 130 may be joined together by means of, for example, laser welding, brazing, or the like instead of spot welding.

As the patch member 130, a variety of steel sheets such as a hot-stamped material can be used. In addition, as the patch member 130, a steel sheet having a tensile strength of 1,180 MPa or higher is more preferably used, and a steel sheet having a tensile strength of 1,500 MPa or higher is still more preferably used.

The horizontal wall portion 131 of the patch member 130 has a shape that follows the shape of the main wall portion 121 of the center pillar outer 120. In addition, the side wall portion 132 of the patch member 130 has a shape that follows the shape of the standing wall portion 122 of the center pillar outer 120. That is, in the center pillar 100, the horizontal wall portion 131 of the patch member 130 abuts the main wall portion 121 of the center pillar outer 120, and the side wall portions 132 of the patch member 130 abut the standing wall portions 122 of the center pillar outer 120.

As described above, in the center pillar 100, the patch member 130 is joined to the center pillar outer 120, and thus it is possible to reinforce the center pillar outer 120. In addition, the patch member 130 is joined to the center pillar outer 120, and thus it is possible to reinforce only necessary portions. Therefore, compared with a case in which the sheet thickness of the entire center pillar outer 120 is increased, it is possible to reduce an increase in weight.

As shown in FIG. 2, at least a portion of the spot-welding portion 160 is preferably formed in a range of L1 (mm) from a side end surface 132b (tip end surface) of the side wall portion 132 of the patch member 130. Here, L1 represents 40% of the height (the distance from the side end surface 132b of the side wall portion 132 to an outer surface 131c of the horizontal wall portion 131) of the side wall portion 132 of the patch member 130. That is, for example, in a case in which the height of the side wall portion 132 of the patch member 130 is 60 mm, at least a portion of the spot-welding portion 160 is preferably formed in a range of L1=24 mm from the side end surface 132b of the side wall portion 132 of the patch member 130.

At least a portion of the spot-welding portion 170 is preferably formed in a range of L2 (mm) from the inner surface 132a of the side wall portion 132. Here, similar to L1, L2 represents 40% of the height (the distance from the side end surface 132b of the side wall portion 132 to the outer surface 131c of the horizontal wall portion 131) of the side wall portion 132 of the patch member 130. Meanwhile, in a case in which an R portion is provided between the main wall portion 121 and the standing wall portion 122, at least a portion of the spot-welding portion 170 is preferably formed in a range of L2 from an R stop.

Next, individual parameters of the center pillar 100 will be described. In the center pillar 100, the center pillar outer 120 and the patch member 130 satisfy both Expressions (1) and (2) below.

$(H/t) \leq 20.0$ <span style="float:right">Expression (1)</span>

$0.6 \leq (H1/H) \leq 1.0$ <span style="float:right">Expression (2)</span>

Here, as shown in FIG. 2, H (mm) represents larger one of the distance between an outer surface 123b of the flange portion 123 and the outer surface 121b of the main wall portion 121 and the distance between the outer surface 123b of the flange portion 123 and the outer surface 131c of the horizontal wall portion 131. That is, in the center pillar 100, since the patch member 130 is joined to the outer surface of the center pillar outer 120, the H represents the distance (height) from the outer surface 123b of the flange portion 123 of the center pillar outer 120 to the outer surface 131c of the horizontal wall portion 131 of the patch member 130.

In addition, t (mm) represents the sum of the sheet thickness of the standing wall portion 122 of the center pillar outer 120 and the sheet thickness of the side wall portion 132 of the patch member 130.

In addition, H1 (mm) represents a larger distance (height) of the distance between the side end surface 132b of the side wall portion 132 and the outer surface 121b of the main wall portion 121 and the distance between the side end surface 132b of the side wall portion 132 and the outer surface 131c of the horizontal wall portion 131. That is, in the center pillar 100, since the patch member 130 is joined to the outer surface of the center pillar outer 120, the H1 represents the distance (height) from the side end surface 132b of the side wall portion 132 to the outer surface 131c of the horizontal wall portion 131.

In the center pillar 100, as described below, the patch member 130 is joined to the center pillar outer 120, and thus the center pillar outer 120 is reinforced, and both Expression (1) and Expression (2) are satisfied. Therefore, it is possible to improve the energy absorption efficiency when the impact F is exerted. Here, the reason for establishing Expression (1) and Expression (2) is as described below.

In a case in which Expression (1) is not satisfied ((H/t) >20.0): The standing wall portions 122 of the center pillar outer 120 easily buckling-deform, and there is a concern that the standing wall portions 122 may break before sufficiently sustaining the load from the impact. In this case, the load after breakage is received by the center pillar inner 110, the main wall portion 121 of the center pillar outer 120, and the horizontal wall portion 131 of the patch member 130. In such a case, when the center pillar 100 is seen in the longitudinal direction, there is a concern that the center pillar 100 may deform in a wide range including locations away from an impact point and may come inside the cabin.

In a case in which the lower limit value of Expression (2) is not satisfied (0.6>(H1/H)): The standing wall portions 122 of the center pillar outer 120 are incapable of sufficiently obtaining the reinforcement effect of the side wall portions 132 of the patch member 130, and thus the standing wall portions 122 easily buckling-deform, and there is a concern that the standing wall portions 122 may break before sufficiently sustaining the load from the impact. In this case, the load after breakage is received by the center pillar inner 110, the main wall portion 121 of the center pillar outer 120, and the horizontal wall portion 131 of the patch member 130. In such a case, when the center pillar 100 is seen in the longitudinal direction, there is a concern that the center pillar 100 may deform in a wide range including locations away from an impact point and may come inside the cabin.

In a case in which the upper limit value of Expression (2) is not satisfied ((H1/H)>1.0): This case cannot occur in a dimensional sense, and thus it is not possible to join the patch member 130 to the center pillar outer 120. Therefore, it is not possible to sufficiently obtain the reinforcement effect of the patch member 130, and thus the standing wall portions 122 easily buckling-deform, and there is a concern that the standing wall portions 122 may break before sufficiently sustaining the load from the impact.

In a case in which both Expression (1) and Expression (2) are satisfied: This case is within the scope of the present invention, and it is possible to prevent the standing wall portions 122 of the center pillar outer 120 from breaking due to impact. In addition, collision energy can be reliably absorbed by the deformation operation of the standing wall portions 122 of the center pillar outer 120 and the side wall portions 132 of the patch member 130.

Meanwhile, regarding Expression (1), from the viewpoint of a breakage-preventing effect, the value of H/t is preferably smaller. For example, H/t is preferably 17.5 or less, more preferably 15.0 or less, and still more preferably 12.5 or less. On the other hand, the lower limit of H/t is not particularly limited, but H/t is, for example, 5.0 or more.

In addition, regarding Expression (2), from the viewpoint of the breakage-preventing effect, H1/H is preferably 0.7 or more, and more preferably 0.8 or more.

Figure 3:
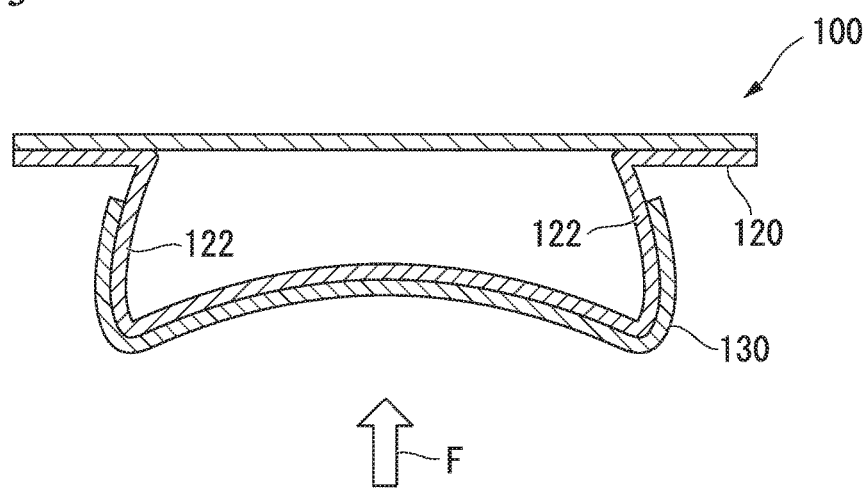
FIG. 3 is a cross-sectional view in the direction of the A-A line in FIG. 1A and a view showing an example of deformation when a load is applied to the center pillar.

An example of deformation occurring in a case in which the impact F is exerted on the center pillar 100 satisfying both Expressions (1) and (2) is shown in FIG. 3. In FIG. 3, since the center pillar 100 satisfies both Expressions (1) and (2), the standing wall portions 122 of the center pillar outer 120 are sufficiently reinforced by the patch member 130, and it is possible to prevent the standing wall portions 122 from easily buckling-deforming.

Figure 4A:
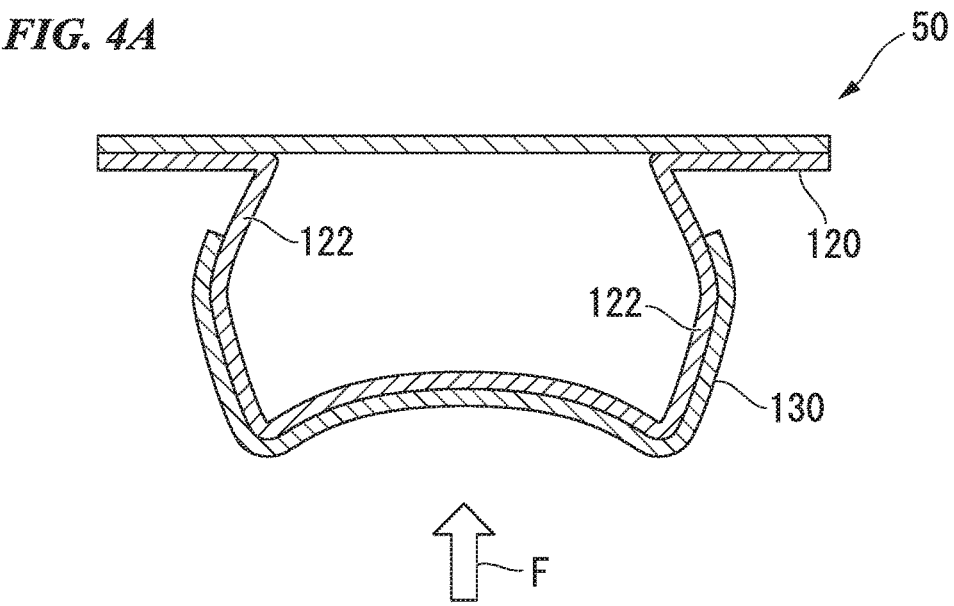
FIG. 4A is a cross-sectional view showing an example of deformation when a load is applied to a center pillar not satisfying Expression (1).

On the other hand, an example of deformation occurring in a case in which the impact F is exerted on a center pillar 50 not satisfying Expression (1) is shown in FIG. 4A. In FIG. 4A, since the center pillar 50 does not satisfy Expression (1), it is not possible to sufficiently reinforce the standing wall portions 122 of the center pillar outer 120 using the patch member 130, and the standing wall portions 122 easily buckling-deform.

Figure 4B:
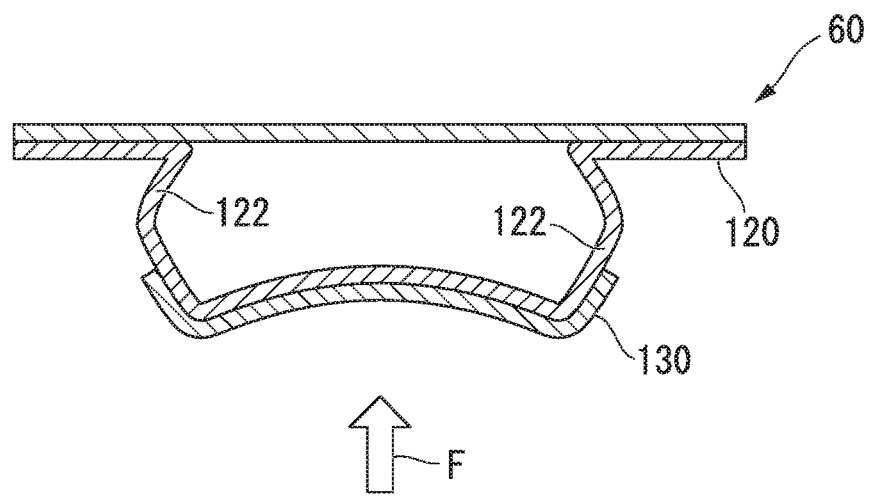
FIG. 4B is a cross-sectional view showing an example of deformation when a load is applied to a center pillar not satisfying Expression (2).

In addition, an example of deformation occurring in a case in which the impact F is exerted on a center pillar 60 not satisfying Expression (2) is shown in FIG. 4B. In FIG. 4B, since the center pillar 60 does not satisfy Expression (2), it is not possible to sufficiently obtain the reinforcement effect of the patch member 130, and the standing wall portions 122 easily buckling-deform.

As described above, according to the center pillar 100 of the present embodiment, since the patch member 130 is joined to the center pillar outer 120, it is possible to reinforce only necessary portions without increasing the sheet thickness of the entire center pillar outer 120. Therefore, it is possible to reinforce the center pillar outer 120 while suppressing an increase in the weight of the center pillar 100. In addition, since the center pillar outer 120 and the patch member 130 satisfy both Expression (1) and Expression (2), in a case in which an impact is exerted from a side of a vehicle body, it is possible to prevent the breakage of the standing wall portions 122 of the center pillar outer 120. Therefore, it is possible to improve the collision energy absorption efficiency at low costs.

Meanwhile, in the center pillar 100, a predetermined distance D (mm) is preferably provided between the side end surface 132b of the side wall portion 132 of the patch member 130 and the outer surface 123b of the flange portion 123 of the center pillar outer 120 as shown in FIG. 2 (D>0). In other words, regarding Expression (2), H1/H is preferably less than 1.0 ((H1/H)<1.0). In this case, since a gap is generated between the side end surface 132b of the side wall portion 132 of the patch member 130 and the outer surface 123b of the flange portion 123 of the center pillar outer 120, it is possible to prevent the side end surface 132b of the patch member 130 from being confined in the flange portion 123 of the center pillar outer 120 when the patch member 130 is deformed by the impact F. Therefore, it is possible to cause the side wall portions 132 of the patch member 130 to reliably follow the deformation of the standing wall portions 122 of the center pillar outer 120, and consequently, it is possible to prevent the peeling of the spot-welding portions 160.

Meanwhile, the distance D is more preferably set to, for example, 10% or more of H. That is, regarding Expression (2), H1/H is more preferably 0.9 or less.

[Modification Example of First Embodiment]

Figure 5:
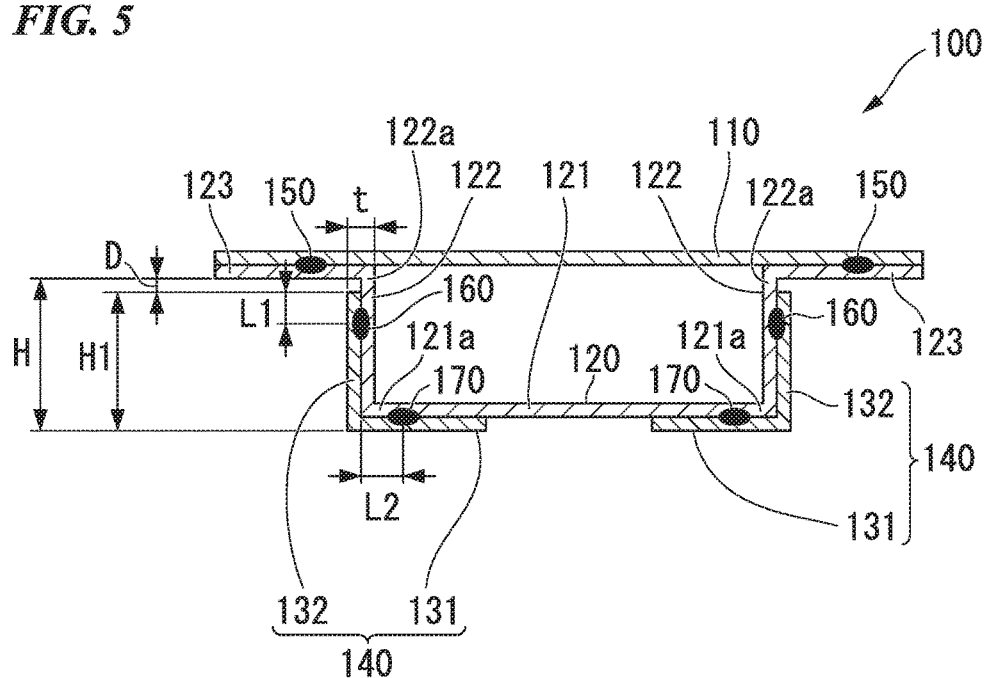
FIG. 5 is a cross-sectional view in the direction of the A-A line in FIG. 1A and a view showing a modification example of the center pillar according to the first embodiment of the present invention.

In the present embodiment, a case in which the channel-like patch member 130 is joined to the center pillar outer 120 has been described. However, a pair of patch members 140 having an L-like cross-sectional shape may be joined to the center pillar outer 120 as shown in FIG. 5. In this case, the volume of the horizontal wall portions 131 of the patch members 140 which abut the main wall portion 121 of the center pillar outer 120 becomes small, and thus it is possible to reduce the weight of the center pillar 100.

(Second Embodiment)

Next, a center pillar 200 according to a second embodiment of the present invention will be described.

Figure 6:
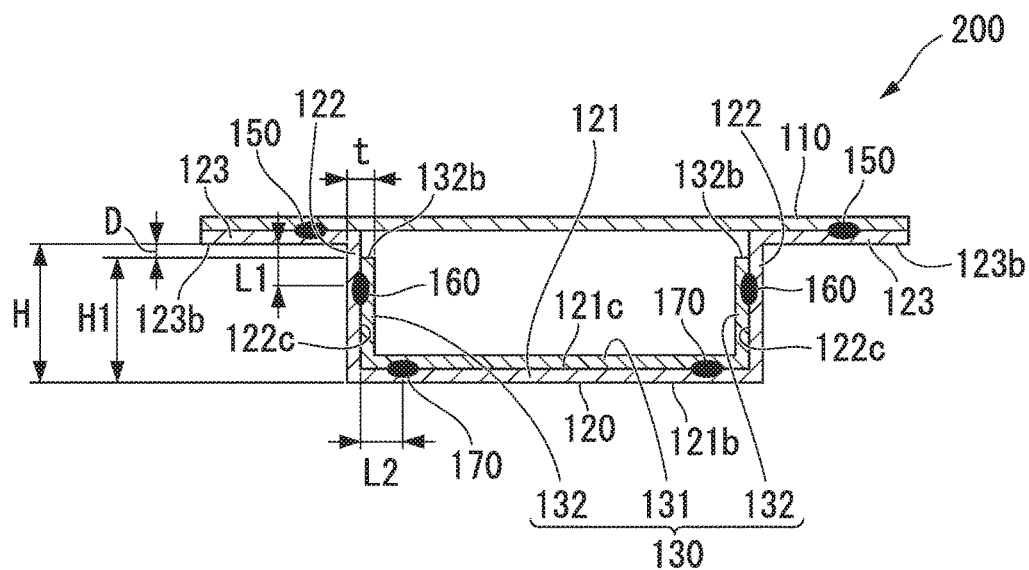
FIG. 6 is a cross-sectional view in the direction of the A-A line in FIG. 1A and a view showing a center pillar according to a second embodiment of the present invention.

FIG. 6 is a horizontal cross-sectional view showing the center pillar 200 according to the present embodiment. In the center pillar 100 according to the first embodiment, a case in which the patch member 130 is joined to the outer surface of the center pillar outer 120 has been described. In contrast, in the center pillar 200 according to the present embodiment, the patch member 130 is joined to an inner surface of the center pillar outer 120 as shown in FIG. 6.

In the center pillar 200, as shown in FIG. 6, the horizontal wall portion 131 of the patch member 130 is joined to an inner surface 121c of the main wall portion 121 of the center pillar outer 120 using the spot-welding portions 170, and the side wall portions 132 of the patch member 130 are joined to inner surfaces 122c of the standing wall portions 122 of the center pillar outer 120 using the spot-welding portions 160.

That is, the center pillar 200 according to the present embodiment is, similar to the center pillar 100 according to the first embodiment, capable of reinforcing the center pillar outer 120. In addition, the center pillar 200 is, similar to the center pillar 100 according to the first embodiment, capable of improving the collision energy absorption efficiency by satisfying Expression (1) and Expression (2).

Meanwhile, regarding Expression (1) and Expression (2), in the center pillar 200, since the patch member 130 is joined to the inner surface of the center pillar outer 120, H (mm) becomes the distance (height) from the outer surface 123b of the flange portion 123 of the center pillar outer 120 to the outer surface 121b of the main wall portion 121 of the center pillar outer 120. In addition, H1 (mm) becomes the distance (height) from the side end surface 132b of the side wall portion 132 of the patch member 130 to the outer surface 121b of the main wall portion 121 of the center pillar outer 120.

[Modification Example of Second Embodiment]

Figure 7:
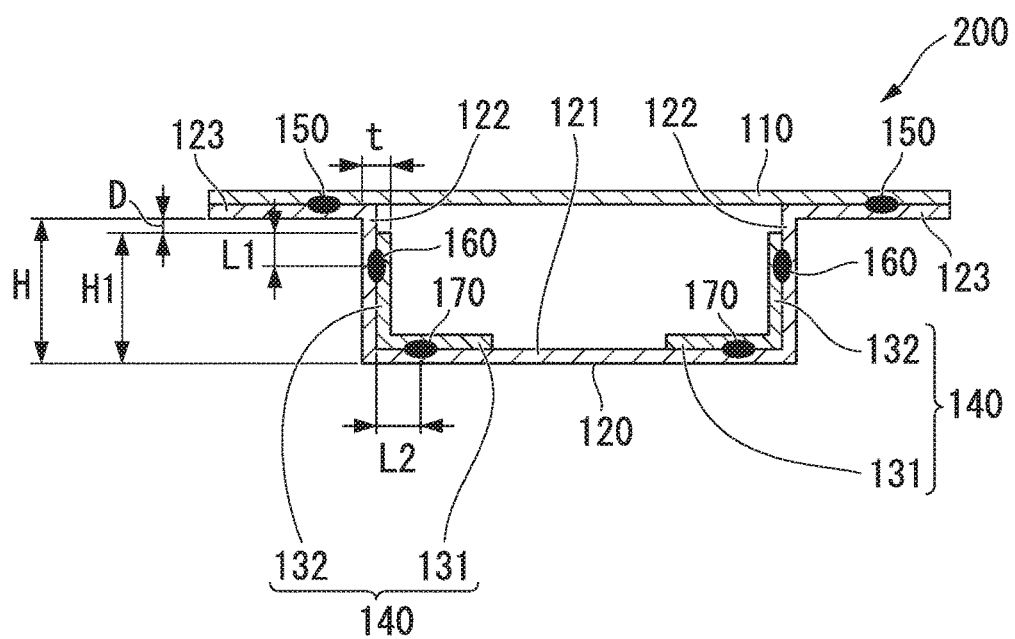
FIG. 7 is a cross-sectional view in the direction of the A-A line in FIG. 1A and a view showing a modification example of the center pillar.

In the present embodiment, a case in which the channel-like patch member 130 is joined to the inner surface of the center pillar outer 120 has been described. However, the pair of patch members 140 having an L-like cross-sectional shape may be joined to the inner surface of the center pillar outer 120 as shown in FIG. 7. In this case, the volume of the horizontal wall portions 131 of the patch members 140 which abut the main wall portion 121 of the center pillar outer 120 becomes small, and thus it is possible to reduce the weight of the center pillar 200.

(Third Embodiment)

Next, a bumper 300 according to a third embodiment of the present invention will be described.

Figure 8:
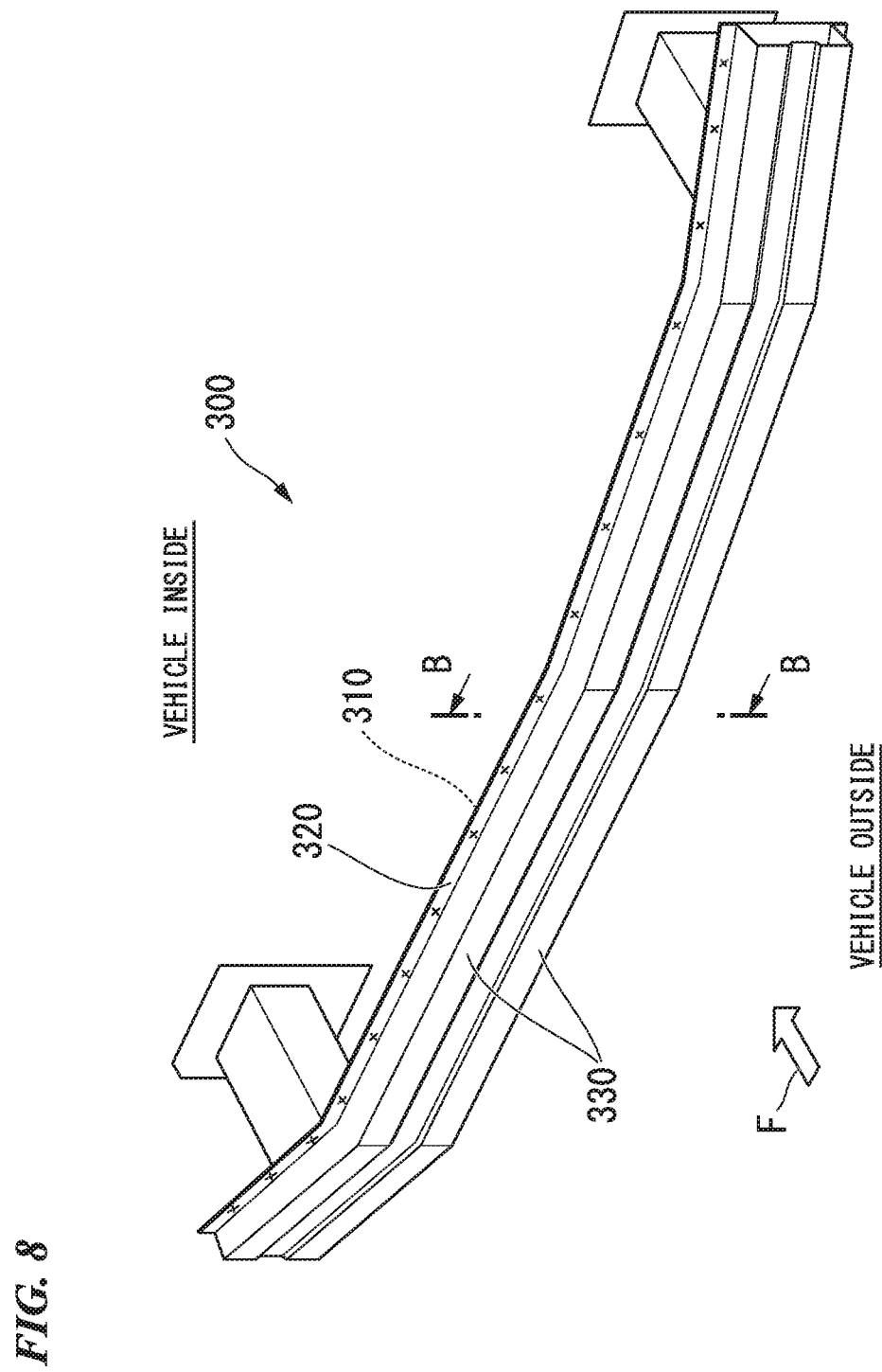
FIG. 8 is a schematic perspective view showing a bumper according to a third embodiment of the present invention wherein the bumper includes a first steel sheet member and a second steel sheet member.
Figure 9:
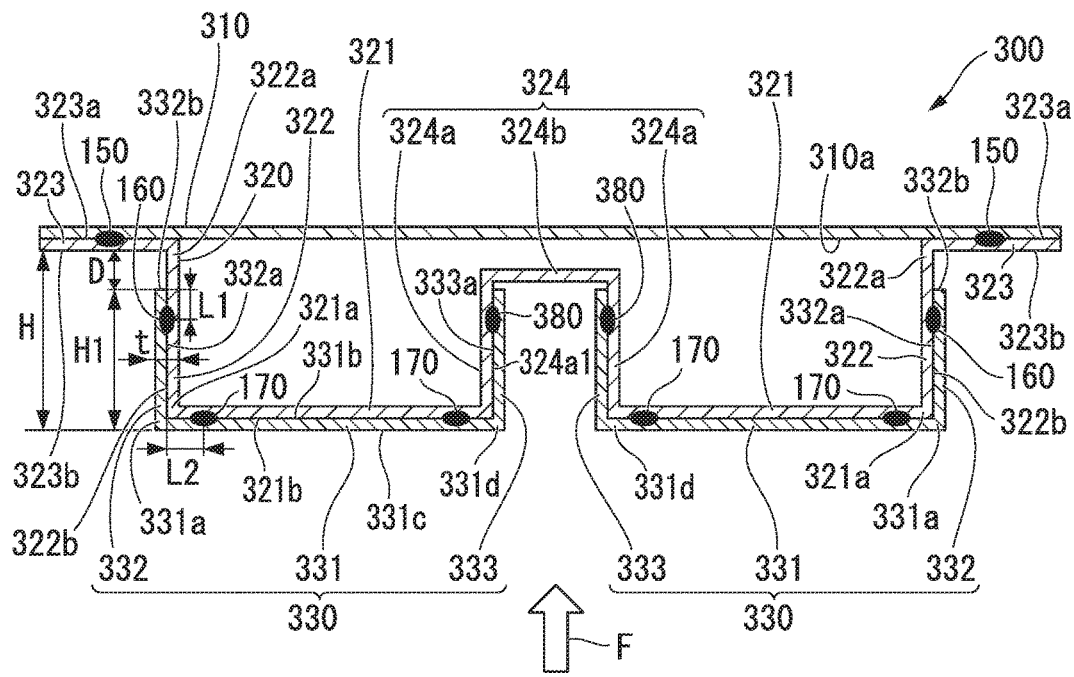
FIG. 9 is a cross-sectional view in a direction of a B-B line in FIG. 8.

FIG. 8 is a schematic perspective view showing the bumper 300 (automotive structural member) according to a third embodiment of the present invention. In addition, FIG. 9 is a cross-sectional view in a direction of the B-B line in FIG. 8. In the first embodiment and the second embodiment, cases in which the center pillar 100 or the center pillar 200 includes the patch member 130 have been described. In contrast, in the present embodiment, the bumper 300 includes a pair of patch members 330.

As shown in FIG. 8 and FIG. 9, the bumper 300 is long in one direction and includes a baseplate 310, a bumper main body 320 (first steel sheet member) joined to the baseplate 310, and the pair of patch members 330 (second steel sheet members) joined to the bumper main body 320. In addition, the bumper 300 is disposed on the front side or rear side of an automotive body.

In addition, as shown in FIG. 9, a cross-section of the bumper 300 which is perpendicular to the longitudinal direction is a hollow cross-section, and, when the impact F is exerted from the front side or rear side of a vehicle body, the bumper receives a load from the impact F, bending-deforms, and absorbs collision energy.

The baseplate 310 of the bumper 300 has a flat sheet shape. In addition, the baseplate 310 of the bumper 300 is a steel sheet having, for example, a sheet thickness of 1.4 mm and a tensile strength of 980 MPa or higher.

Meanwhile, as the baseplate 310, a steel sheet of 1,180 MPa or higher is more preferably used.

As shown in FIG. 9, the bumper main body 320 of the bumper 300 has a hat-like cross-section which is perpendicular to the longitudinal direction and is a steel sheet having a sheet thickness of 0.8 to 2.0 mm and a tensile strength of 980 MPa or higher. In addition, the bumper main body 320 includes a main wall portion 321 facing the baseplate 310, a pair of standing wall portions 322 that vertically stands from both ends 321a of the main wall portion 321, and a pair of flange portions 323 that is parallel to the main wall portion 321 and extends from one end 322a of each of the standing wall portions 322 so as to separate from the main wall portion 321.

Meanwhile, as the bumper main body 320, a steel sheet of 1,180 MPa or higher is more preferably used.

The main wall portion 321 of the bumper main body 320 has a protrusion portion 324 that protrudes toward the baseplate 310 in a widthwise central portion. In addition, the protrusion portion 324 has a pair of center-reinforcing wall portions 324a that stands toward the baseplate 310 from the main wall portion 321 and a flat surface portion 324b that connects the pair of center-reinforcing wall portions 324a.

In addition, the bumper main body 320 is joined to an outer surface 310a (a surface toward the outside of the vehicle body) of the baseplate 310 by spot-welding the flange portions 323. In other words, the spot-welding portions 150 are provided between the outer surface 310a of the baseplate 310 and inner surfaces 323a of the flange portions 323 of the bumper main body 320.

The patch member 330 is a steel sheet having a sheet thickness of 0.8 to 3.0 mm and a tensile strength of 980 MPa or higher. In addition, the patch member 330 has a channel-like cross-sectional shape that is perpendicular to the longitudinal direction and includes a horizontal wall portion 331, a side wall portion 332 that vertically stands from one end 331a of the horizontal wall portion 331, and a holding wall portion 333 that stands from the other end 331d of the horizontal wall portion 331.

Meanwhile, as the patch member 330, a variety of steel sheets such as a hot-stamped material can be used. In addition, as the patch member 330, a steel sheet having a tensile strength of 1,180 MPa or higher is more preferably used, and a steel sheet having a tensile strength of 1,500 MPa or higher is still more preferably used.

The patch member 330 is joined to the outer surface of the bumper main body 320 by spot-welding the side wall portion 332 and the standing wall portion 322 of the bumper main body 320, spot-welding the horizontal wall portion 331 and the main wall portion 321 of the bumper main body 320, and spot-welding the holding wall portion 333 and the center-reinforcing wall portion 324a of the bumper main body 320. In other words, the spot-welding portion 160 is formed between an outer surface 322b of the standing wall portion 322 of the bumper main body 320 and an inner surface 332a of the side wall portion 332 of the patch member 330, the spot-welding portions 170 are formed between an outer surface 321b of the main wall portion 321 of the bumper main body 320 and an inner surface 331b of the horizontal wall portion 331 of the patch member 330, and a spot-welding portion 380 is formed between an outer surface 324a1 of the center-reinforcing wall portion 324a of the bumper main body 320 and an inner surface 333a of the holding wall portion 333 of the patch member 330.

The horizontal wall portion 331 of the patch member 330 has a shape that follows the shape of the main wall portion 321 of the bumper main body 320. In addition, the side wall portion 332 of the patch member 330 has a shape that follows the shape of the standing wall portion 322 of the bumper main body 320. In addition, the holding wall portion 333 of the patch member 330 has a shape that follows the shape of the center-reinforcing wall portion 324a of the bumper main body 320. That is, in the bumper 300, the horizontal wall portion 331 of the patch member 330 abuts the main wall portion 321 of the bumper main body 320, the side wall portion 332 of the patch member 330 abuts the standing wall portion 322 of the bumper main body 320, and the holding wall portion 333 of the patch member 330 abuts the center-reinforcing wall portion 324a of the bumper main body 320.

As described above, in the bumper 300, the patch members 330 are joined to the bumper main body 320, and thus it is possible to reinforce the bumper main body 320. Therefore, in a case in which the impact F is exerted on the bumper 300, it is possible to prevent the breakage or the like of the standing wall portions 322 of the bumper main body 320. In addition, the bumper main body 320 is reinforced by the patch members 330, and thus it is possible to reinforce only necessary portions. Therefore, compared with a case in which the sheet thickness of the entire bumper main body 320 is increased, it is possible to reduce an increase in weight.

Next, individual parameters of the bumper 300 will be described. In the bumper 300, the bumper main body 320 and the patch member 330 satisfy both Expressions (1) and (2) which have been described in the first embodiment.

$$(H/t) \leq 20.0 \quad \text{Expression (1)}$$

$$0.6 \leq (H1/H) \leq 1.0 \quad \text{Expression (2)}$$

Here, similar to the case of the first embodiment, H (mm) represents the distance (height) from the outer surface 323b of the flange portion 323 of the bumper main body 320 to the outer surface 331c of the horizontal wall portion 331 of the patch member 330. In addition, t (mm) represents the sum of the sheet thickness of the standing wall portion 322 of the bumper main body 320 and the sheet thickness of the side wall portion 332 of the patch member 330. In addition, H1 (mm) represents the distance (height) from a side end surface 332b (tip end surface) of the side wall portion 332 of the patch member 330 to the outer surface 331c of the horizontal wall portion 331.

In the bumper 300, similar to the case of the first embodiment, the patch members 330 are joined to the bumper main body 320, and thus the bumper main body 320 is reinforced, and both Expression (1) and Expression (2) are satisfied. Therefore, it is possible to improve the energy absorption efficiency when the impact F is exerted.

[Modification Example of Third Embodiment]

Figure 10:
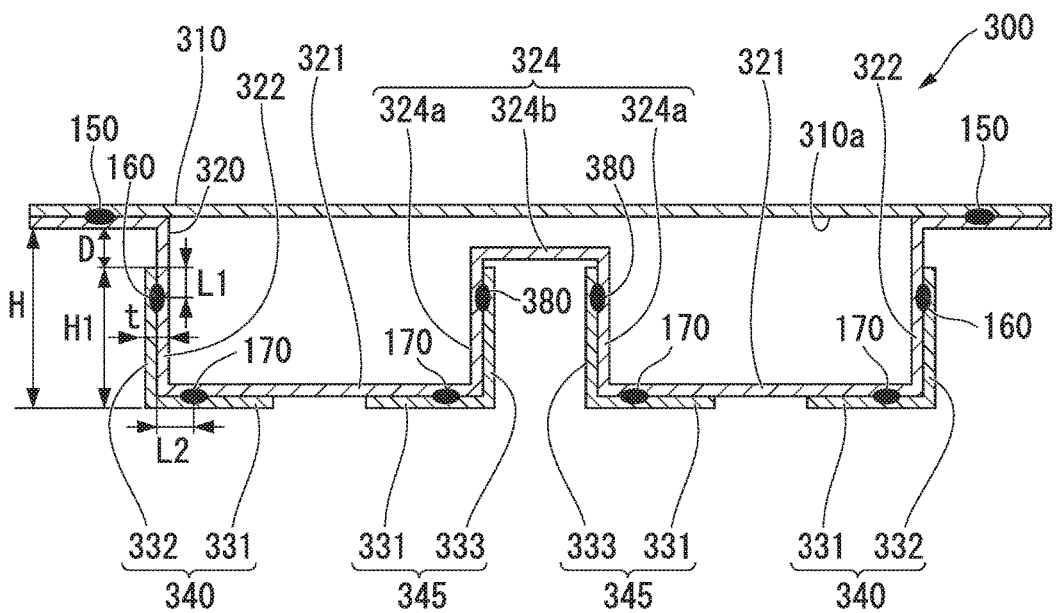
FIG. 10 is a cross-sectional view in the direction of the B-B line in FIG. 8 and a view showing a modification example of the bumper.

In the present embodiment, a case in which the channel-like patch members 330 are joined to the bumper main body 320 has been described. However, a pair of patch members 340 and a pair of patch members 345 which have an L-like cross-sectional shape may be joined to the bumper main body 320 as shown in FIG. 10. In this case, the volume of the horizontal wall portions 331 of the patch members 330 which abut the main wall portion 321 of the bumper main body 320 becomes small, and thus it is possible to further reduce the weight of the bumper 300.

(Fourth Embodiment)

Next, a bumper 400 according to a fourth embodiment of the present invention will be described.

Figure 11:
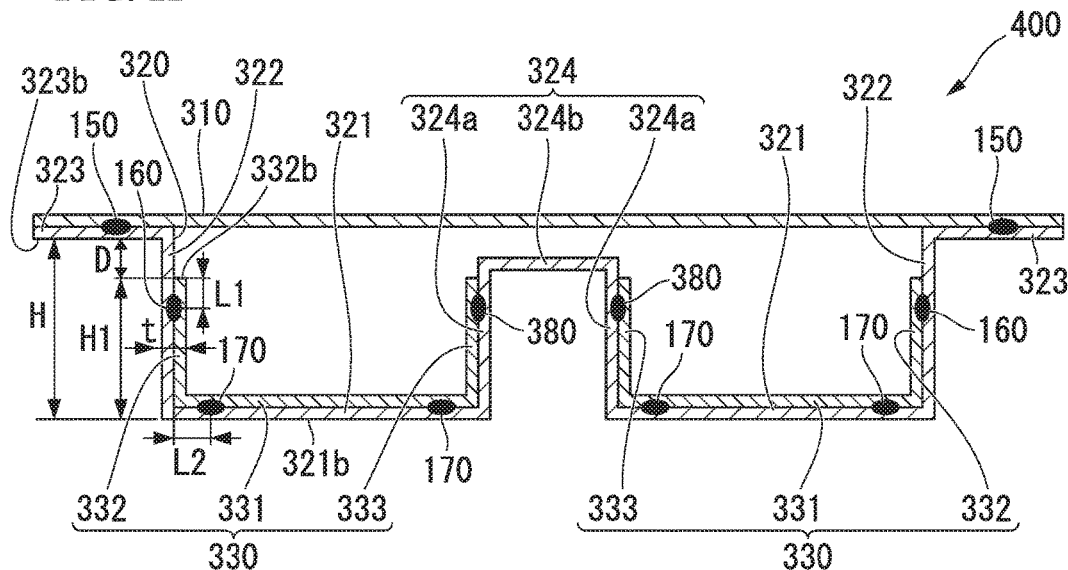
FIG. 11 is a cross-sectional view in the direction of the B-B line in FIG. 8 and a view showing a bumper according to a fourth embodiment of the present invention.

FIG. 11 is a horizontal cross-sectional view showing a bumper 400 according to the present embodiment. In the bumper 300 of the third embodiment, a case in which the patch members 330 are joined to the outer surface of the bumper main body 320 has been described. In contrast, in the bumper 400 according to the present embodiment, the patch members 330 are joined to an inner surface of the bumper main body 320 as shown in FIG. 11.

As shown in FIG. 11, in the bumper 400, the horizontal wall portion 331 of the patch member 330 is joined to an inner surface of the main wall portion 321 of the bumper main body 320 using the spot-welding portions 170, and the side wall portion 332 of the patch member 330 is joined to an inner surface of the standing wall portion 322 of the bumper main body 320 using the spot-welding portion 160.

That is, in the bumper 400 according to the present embodiment, similar to the bumper 300 according to the third embodiment, it is possible to reinforce the bumper main body 320. In addition, the bumper 400 is, similar to the bumper 300 according to the third embodiment, capable of improving the collision energy absorption efficiency by satisfying Expression (1) and Expression (2).

Meanwhile, regarding Expression (1) and Expression (2), in the present embodiment, since the patch member 330 is joined to the inner surface of the bumper main body 320, H (mm) becomes the distance (height) from the outer surface 323b of the flange portion 323 of the bumper main body 320 to the outer surface 321b of the main wall portion 321 of the bumper main body 320. In addition, H1 (mm) becomes the distance (height) from the side end surface 332b of the side wall portion 332 of the patch member 330 to the outer surface 321b of the main wall portion 321 of the bumper main body 320.

[Modification Example of Fourth Embodiment]

Figure 12:
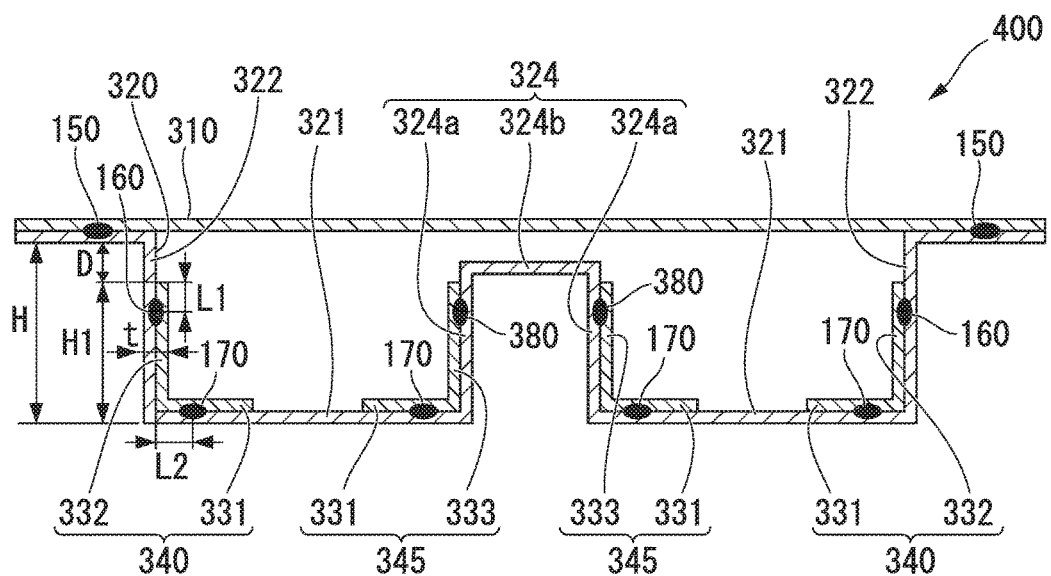
FIG. 12 is a cross-sectional view in the direction of the B-B line in FIG. 8 and a view showing a modification example of the bumper.

In the present embodiment, a case in which the channel-like patch members 330 are joined to the inner surface of the bumper main body 320 has been described. However, the pair of patch members 340 and the pair of patch members 345 which have an L-like cross-sectional shape may be joined to the bumper main body 320 as shown in FIG. 12. In this case, the volume of the horizontal wall portions 331 of the patch members 340 and 345 which abut the main wall portion 321 of the bumper main body 320 becomes small, and thus it is possible to further reduce the weight of the bumper 400.

(Fifth Embodiment)

Next, a door beam 500 according to a fifth embodiment of the present invention will be described.

Figure 13:
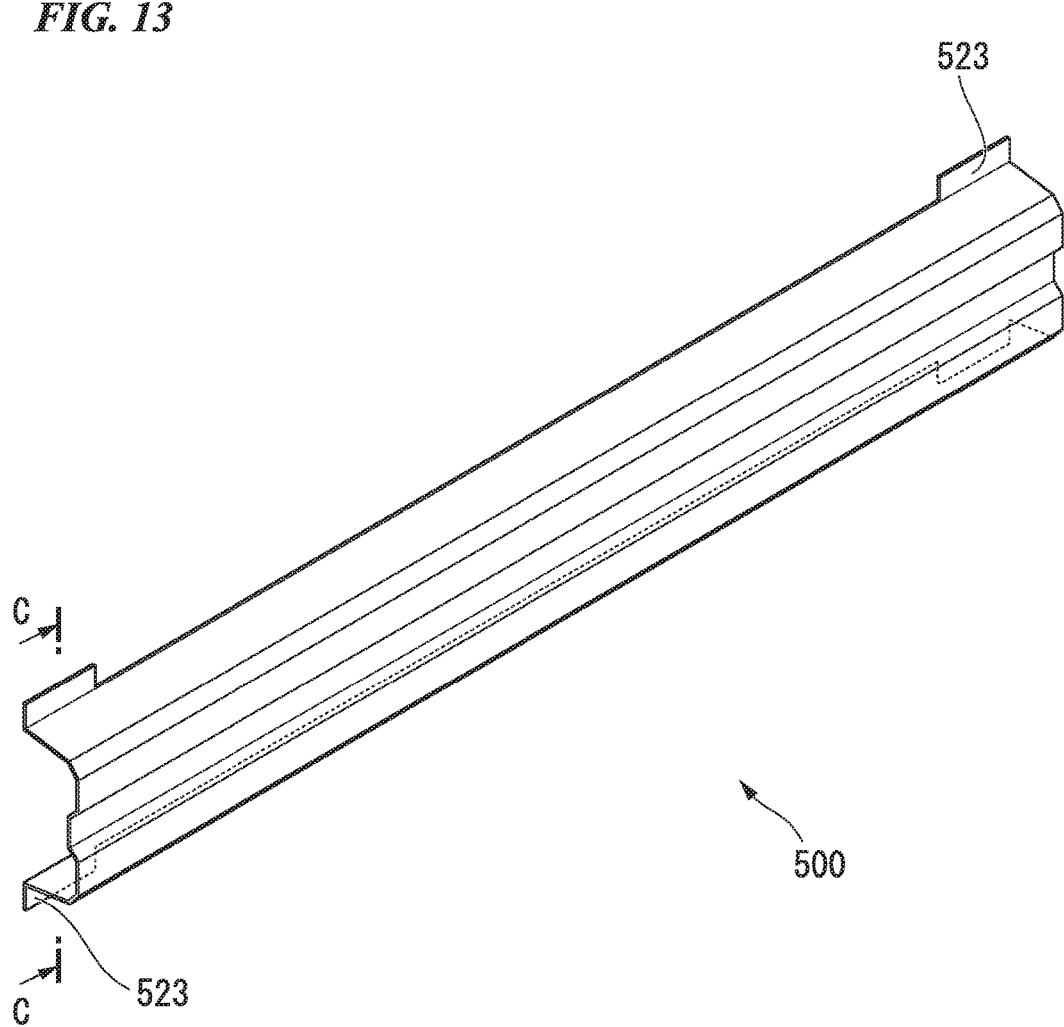
FIG. 13 is a schematic perspective view showing a door beam according to a fifth embodiment of the present invention wherein the door beam includes a first steel sheet member and a second steel sheet member.
Figure 14:
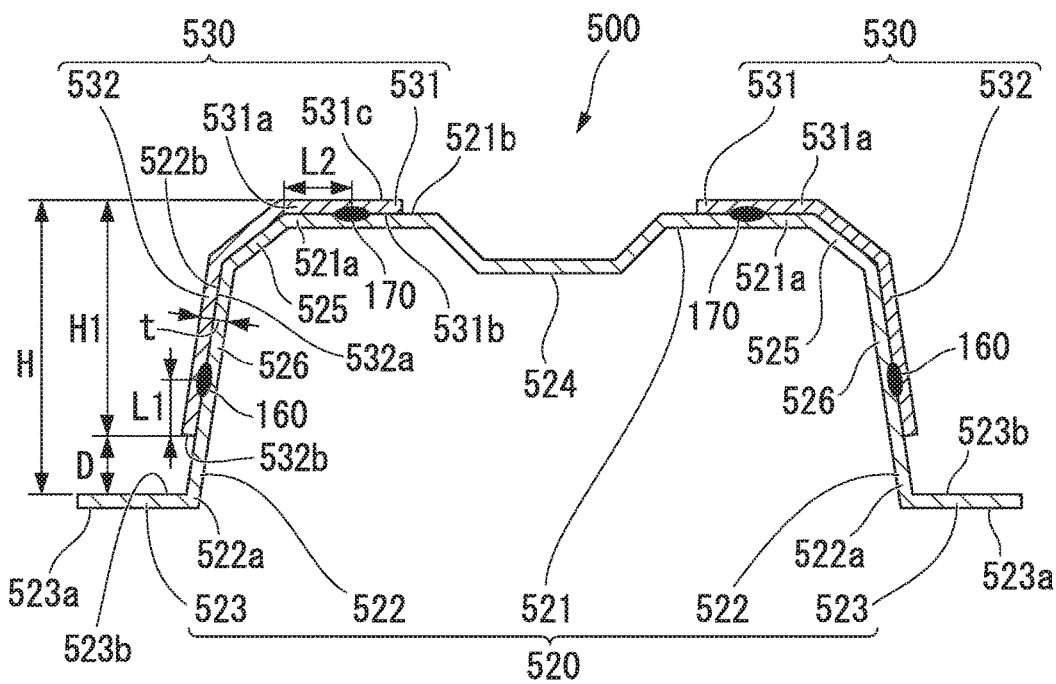
FIG. 14 is a cross-sectional view in a direction of a C-C line in FIG. 13.

FIG. 13 is a schematic perspective view showing the door beam 500 (automotive structural member) according to the present embodiment. In addition, FIG. 14 is a cross-sectional view in a direction of the C-C line in FIG. 13. In the first embodiment, a case in which the center pillar 100 includes the patch member 130 has been described. In contrast, in the present embodiment, the door beam 500 includes patch members 530.

As shown in FIG. 13 and FIG. 14, the door beam 500 is long in one direction and includes a door beam main body 520 (first steel sheet member) and a pair of patch members 530 (second steel sheet members) joined to the door beam main body 520. In addition, the door beam 500 is disposed in a door of an automobile (not shown) by spot-welding inner surfaces 523a of flange portions 523 of the door beam main body 520 to the door of the automobile.

The door beam main body 520 of the door beam 500 is a steel sheet having a sheet thickness of 0.8 to 2.0 mm and a tensile strength of 980 MPa or higher. In addition, as shown in FIG. 14, the door beam main body 520 has a hat-like cross-section which is perpendicular to the longitudinal direction and includes a main wall portion 521, a pair of standing wall portions 522 that stands from both ends 521a of the main wall portion 521, and a pair of the flange portions 523 that is parallel to the main wall portion 521 and extends from one end 522a of each of the standing wall portions 522 so as to separate from the main wall portion 521.

Meanwhile, as the door beam main body 520, a steel sheet having a tensile strength of 1,180 MPa or higher is more preferably used.

The main wall portion 521 of the door beam main body 520 has a protrusion portion 524 which is provided in the widthwise central portion and protrudes toward the flange portion 523. In addition, the standing wall portion 522 of the door beam main body 520 has a first inclined portion 525 which is connected to the end 521a of the main wall portion 521 and has a predetermined inclination angle and a second inclined portion 526 which is connected to the first inclined portion 525 and has an inclination angle that is different from the above-described inclination angle.

The patch member 530 of the door beam 500 is a steel sheet having a sheet thickness of 0.8 to 3.0 mm and a tensile strength of 1,180 MPa or higher. In addition, as shown in FIG. 14, the patch member 530 has an L-like cross-sectional shape and has a horizontal wall portion 531 and a side wall portion 532 that stands from one end 531a of the horizontal wall portion 531.

In addition, the patch member 530 is joined to an outer surface of the door beam main body 520 by spot-welding the horizontal wall portion 531 and the main wall portion 521 of the door beam main body 520 and spot-welding the side wall portions 532 and the standing wall portions 522 of the door beam main body 520. In other words, the spot-welding portion 160 is formed between an outer surface 522b of the standing wall portion 522 of the door beam main body 520 and an inner surface 532a of the side wall portion 532 of the patch member 530, and the spot-welding portion 170 is formed between an outer surface 521b of the main wall portion 521 of the door beam main body 520 and an inner surface 531b of the horizontal wall portion 531 of the patch member 530.

Meanwhile, as the patch member 530, a variety of steel sheets such as a hot-stamped material can be used. In addition, as the patch member 530, a steel sheet having a tensile strength of 1,180 MPa or higher is more preferably used, and a steel sheet having a tensile strength of 1,500 MPa or higher is still more preferably used.

The horizontal wall portion 531 of the patch member 530 has a shape that follows the shape of the main wall portion 521 of the door beam main body 520. In addition, the side wall portion 532 of the patch member 530 has a shape that follows the shape of the standing wall portion 522 of the door beam main body 520. That is, in the door beam 500, the horizontal wall portion 531 of the patch member 530 abuts the main wall portion 521 of the door beam main body 520, and the side wall portion 532 of the patch member 530 abuts the standing wall portion 522 of the door beam main body 520.

As described above, in the door beam 500, the patch members 530 are joined to the door beam main body 520, and thus it is possible to reinforce the door beam main body 520. Therefore, in a case in which the impact is exerted on the door beam 500, it is possible to prevent the breakage or the like of the standing wall portions 522 of the door beam main body 520. In addition, the patch members 530 are joined to the door beam main body 520, and thus it is possible to reinforce only necessary portions. Therefore, compared with a case in which the sheet thickness of the entire door beam main body 520 is increased, it is possible to reduce an increase in weight.

Next, individual parameters of the door beam 500 will be described. In the door beam 500, the door beam main body 520 and the patch member 530 satisfy both Expressions (1) and (2) which have been described in the first embodiment.

$(H/t) \leq 20.0$   Expression (1)

$0.6 \leq (H1/H) \leq 1.0$   Expression (2)

Here, similar to the case of the first embodiment, H (mm) represents the distance (height) from the outer surface 523b of the flange portion 523 of the door beam main body 520 to the outer surface 531c of the horizontal wall portion 531 of the patch member 530. In addition, t (mm) represents the sum of the sheet thickness of the standing wall portion 522 of the door beam main body 520 and the sheet thickness of the side wall portion 532 of the patch member 530. In addition, H1 (mm) represents the distance (height) from a side end surface 532b (tip end surface) of the side wall portion 532 of the patch member 530 to the outer surface 531c of the horizontal wall portion 531.

In the door beam 500, similar to the case of the first embodiment, the patch members 530 are joined to the door beam main body 520, and thus the door beam main body 520 is reinforced, and both Expression (1) and Expression (2) are satisfied. Therefore, it is possible to improve the energy absorption efficiency when the impact is exerted.

Figure 15:
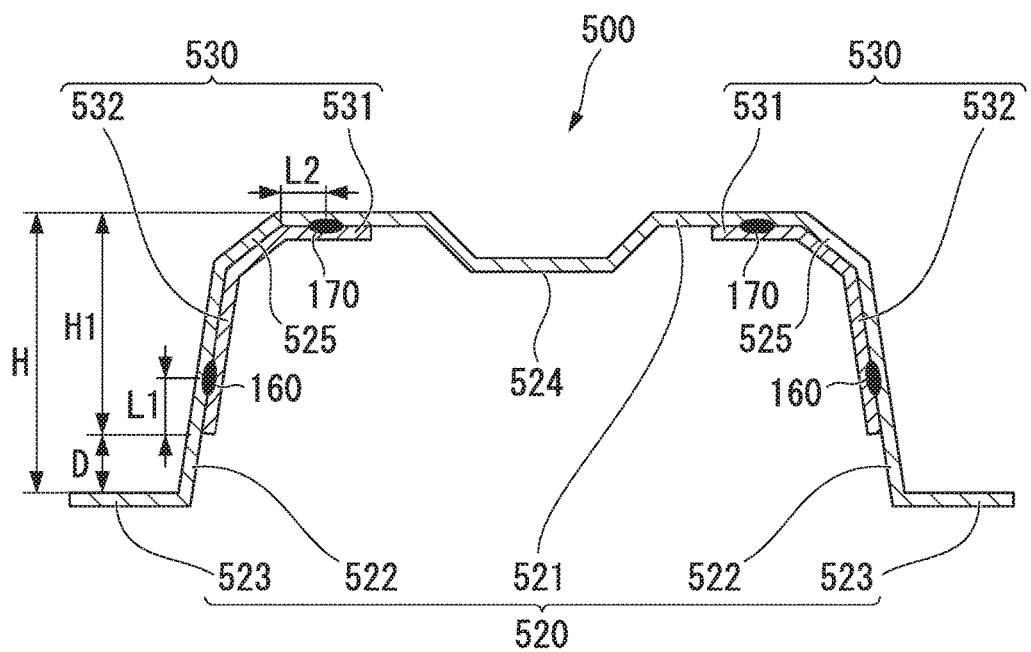
FIG. 15 is a cross-sectional view in the direction of the C-C line in FIG. 13 and a view showing a modification example of the door beam.

Meanwhile, similar to the case of the first embodiment, the patch members 530 may also be joined to an inner surface of the door beam main body 520 as shown in FIG. 15.

EXAMPLES

Next, examples carried out in order to confirm the action effects of the present invention will be described.

An FEM analysis of the three-point bending deformation of a hat-like member which simulated the cross-sectional shape (refer to FIG. 2) of the center pillar 100 according to the first embodiment was carried out, and the energy absorption amount per unit weight was obtained. Specifically, the hat-like member was supported at two points which were located in the longitudinal direction at a predetermined interval, a predetermined load was applied to the central location of the two points, and the energy absorption amount was obtained. In addition, the energy absorption amount was divided by the weight of the hat-like member, thereby obtaining the energy absorption amount per unit weight. At this time, as the hat-like member, a steel sheet having a tensile strength of 980 MPa was used.

In addition, for comparison, the same analysis was also carried out on cases in which Expression (1) and/or Expression (2) were not satisfied. Meanwhile, in Test Nos. 1 to 11 shown in Table 1, the same conditions were set except for H, t, and H1.

TABLE 1

| Test No. | H (mm) | t (mm) | H1 (mm) | H/t | H1/H | Satisfaction of Expression (1) | Satisfaction of Expression (2) | Energy absorption amount EA (kJ) | Weight (kg) | Energy absorption amount per unit weight EA/mass (kJ/kg) | Differentiation |
|---|---|---|---|---|---|---|---|---|---|---|---|
| 1 | 50.0 | 2.0 | 25.0 | 25.0 | 0.50 | No | No | 0.854 | 2.149 | 0.397 | Comparative Example |
| 2 | 50.0 | 2.0 | 40.0 | 25.0 | 0.80 | No | Yes | 0.884 | 2.291 | 0.386 | Comparative Example |
| 3 | 50.0 | 2.0 | 16.5 | 25.0 | 0.33 | No | No | 0.900 | 2.091 | 0.430 | Comparative Example |
| 4 | 40.0 | 2.0 | 20.0 | 20.0 | 0.50 | Yes | No | 0.850 | 2.030 | 0.419 | Comparative Example |
| 5 | 10.0 | 3.0 | 7.0 | 3.3 | 0.70 | Yes | Yes | 1.200 | 1.937 | 0.620 | Invention Example |
| 6 | 40.0 | 2.0 | 25.0 | 20.0 | 0.63 | Yes | Yes | 1.100 | 2.069 | 0.532 | Invention Example |
| 7 | 10.0 | 2.0 | 7.0 | 5.0 | 0.70 | Yes | Yes | 1.040 | 1.599 | 0.650 | Invention Example |
| 8 | 35.0 | 2.0 | 25.0 | 17.5 | 0.71 | Yes | Yes | 1.100 | 1.988 | 0.553 | Invention Example |
| 9 | 30.0 | 2.0 | 25.0 | 15.0 | 0.83 | Yes | Yes | 1.100 | 1.952 | 0.564 | Invention Example |
| 10 | 25.0 | 2.0 | 20.0 | 12.5 | 0.80 | Yes | Yes | 1.150 | 1.874 | 0.614 | Invention Example |
| 11 | 20.0 | 2.0 | 15.0 | 10.0 | 0.75 | Yes | Yes | 1.148 | 1.795 | 0.640 | Invention Example |

In Table 1, Test Nos. 1 to 4 indicate cases in which Expression (1) and/or Expression (2) were not satisfied, that is, comparative examples. On the other hand, Test Nos. 5 to 11 indicate cases in which Expression (1) and/or Expression (2) were satisfied, that is, invention examples.

Figure 16A:
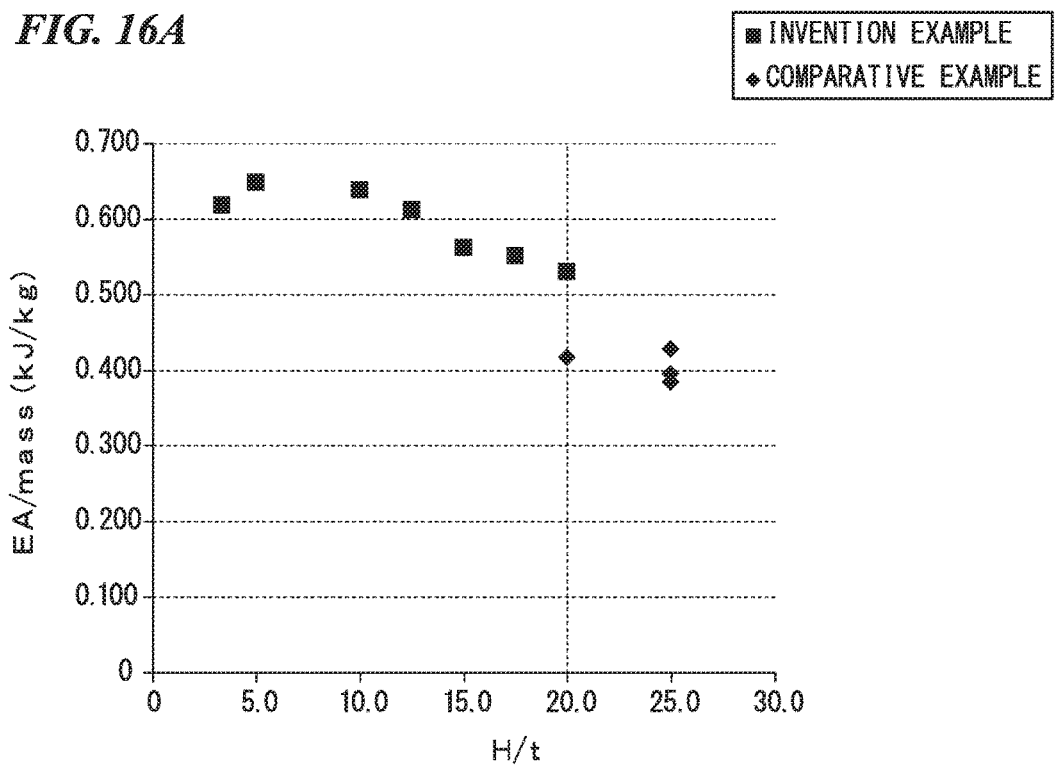
FIG. 16A is a graph showing a relationship between H/t and an energy absorption efficiency.
Figure 16B:
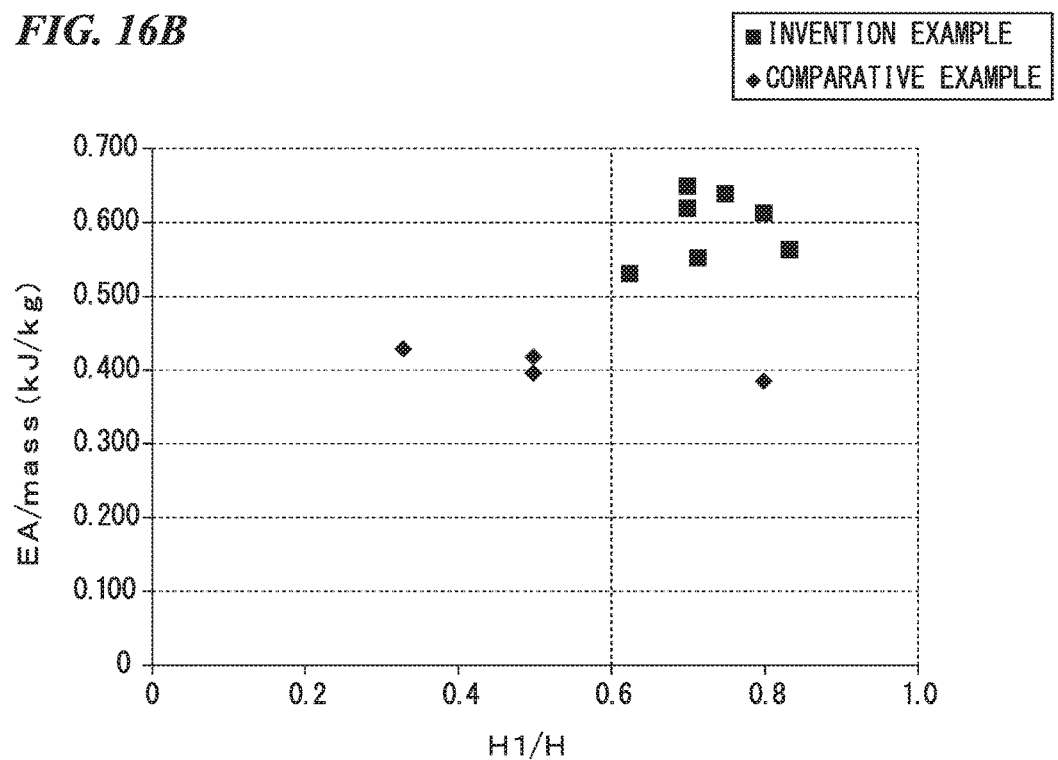
FIG. 16B is a graph showing a relationship between H1/H and the energy absorption efficiency.
Figure 17A:
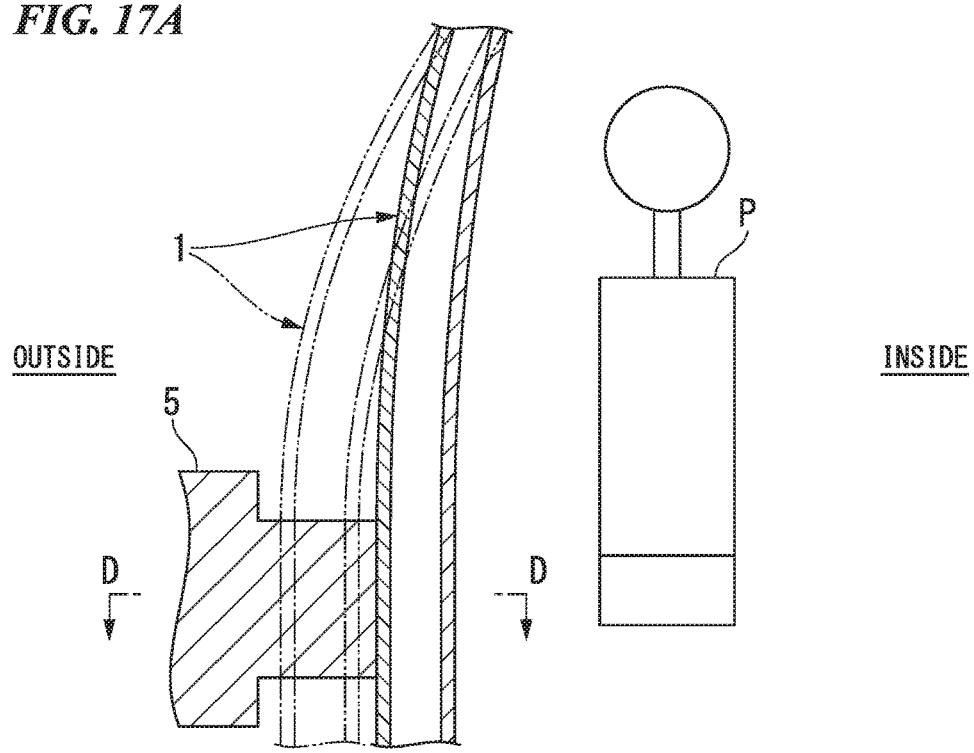
FIG. 17A is a view showing a center pillar of the related art and a cross-sectional view of the center pillar in a cross-section perpendicular to a front and rear direction of a vehicle body.
Figure 17B:
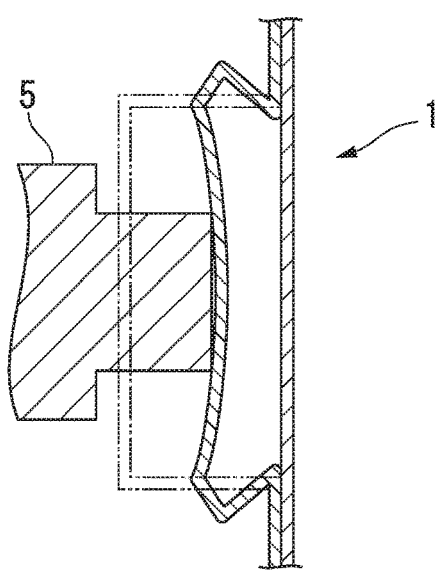
FIG. 17B is a cross-sectional view in a direction of a D-D line in FIG. 17A.

In addition, graphs obtained by plotting the results of Table 1 are shown in FIG. 16A and FIG. 16B. Meanwhile, in FIG. 16A, the horizontal axis indicates H/t, and the vertical axis indicates the energy absorption amount per unit weight EA/mass (kJ/kg). In addition, in FIG. 16B, the horizontal axis indicates H1/H, and the vertical axis indicates the energy absorption amount per unit weight EA/mass (kJ/kg).

As shown in Table 1 and shown in FIG. 16A and FIG. 16B, it could be confirmed that, in the cases in which both Expression (1) and/or Expression (2) were satisfied, the energy absorption amount per unit weight increased compared with the cases in which any one of Expression (1) and Expression (2) was not satisfied and the cases in which both Expression (1) and/or Expression (2) were not satisfied.

While the embodiments of the present invention have been described, but the embodiments are simply examples, and the scope of the present invention is not limited only to the above-described embodiments. The embodiments can be carried out in a variety of other forms and can be omitted, substituted, or modified in various manners within the scope of the gist of the invention. The embodiments or modifications thereof are included in the scope of the invention described in the claims and equivalence thereof as is the case of being included in the scope or gist of the invention.

For example, in the embodiments, the cases in which the automotive structural member is the center pillar, the bumper, or the door beam have been described. However, the present invention is not limited to automotive structural members, and the present invention may be applied to, for example, side sills.

In addition, for example, in the first embodiment, the case in which the patch member 130 is joined to the inner surface of the center pillar outer 120 of the center pillar 100 has been described. However, the patch members 130 may be joined to both the inner surface and the outer surface of the center pillar outer 120.

In addition, for example, in the first embodiment, the case in which the main wall portion 121 of the center pillar outer 120 has a flat sheet shape has been described; however, similar to the bumper 300, a protrusion portion may be provided in the main wall portion 121 of the center pillar outer 120. In addition, in the third embodiment, the case in which the protrusion portion is provided in the main wall portion 321 of the bumper main body 320 has been described, but the main wall portion 321 may have a flat sheet shape. In addition, in the fifth embodiment, the case in which the protrusion portion is provided in the main wall portion 521 of the door beam main body 520 has been described, but the main wall portion 521 may have a flat sheet shape.

INDUSTRIAL APPLICABILITY

According to the present invention, it is possible to provide a steel sheet member combination structure, an automotive structural member, a center pillar, a bumper, and a door beam which are capable of improving the collision energy absorption efficiency at low costs.

BRIEF DESCRIPTION OF THE REFERENCE SYMBOLS

100: center pillar (automotive structural member)
110: center pillar inner
120: center pillar outer (first steel sheet member)
121: main wall portion of center pillar outer
122: standing wall portion of center pillar outer
123: flange portion of center pillar outer
130: patch member (second steel sheet member)

150: spot-welding portion
160: spot-welding portion (first joint portion)
170: spot-welding portion (second joint portion)

The invention claimed is:

1. A steel sheet member combination structure comprising:
    a first steel sheet member having a main wall portion, a standing wall portion that stands from an end edge of the main wall portion, and a flange portion that extends parallel to the main wall portion from an end edge of the standing wall portion; and
    a second steel sheet member that is joined to at least one of an inner surface or an outer surface of the first steel sheet member and has a horizontal wall portion that abuts the main wall portion and a side wall portion that abuts the standing wall portion,
    wherein, when larger one of a distance between an outer surface of the flange portion and an outer surface of the main wall portion and a distance between the outer surface of the flange portion and an outer surface of the horizontal wall portion is defined as H (mm),
    a sum of a sheet thickness of the standing wall portion and a sheet thickness of the side wall portion is defined as t (mm), and
    larger one of a distance between a tip end surface of the side wall portion and the outer surface of the main wall portion and a distance between the tip end surface of the side wall portion and the outer surface of the horizontal wall portion is defined as H1 (mm),
    the first steel sheet member and the second steel sheet member satisfy Expression (1) and Expression (2):

$(H/t) \leq 20.0$      Expression (1)

$0.6 \leq (H1/H) \leq 1.0$      Expression (2).

2. The steel sheet member combination structure according to claim 1, further comprising:
    a first joint portion that joins together the standing wall portion of the first steel sheet member and the side wall portion of the second steel sheet member.

3. The steel sheet member combination structure according to claim 1, further comprising:
    a second joint portion that joins together the main wall portion of the first steel sheet member and the horizontal wall portion of the second steel sheet member.

4. The steel sheet member combination structure according to claim 1,
    wherein the second steel sheet member is a steel sheet having a tensile strength of 980 MPa or higher.

5. The steel sheet member combination structure according to claim 4,
    wherein the first steel sheet member is a steel sheet having a tensile strength of 980 MPa or higher.

6. An automotive structural member comprising:
    the steel sheet member combination structure according to claim 1.

7. A center pillar having the steel sheet member combination structure according to claim 1, the center pillar comprising:
    a center pillar inner;
    a center pillar outer that is constituted of the first steel sheet member of the steel sheet member combination structure and that is joined to the center pillar inner; and
    a patch member that is constituted of the second steel sheet member of the steel sheet member combination structure and that is joined to at least one of an inner surface or an outer surface of the center pillar outer.

8. A bumper having the steel sheet member combination structure according to claim 1, the bumper comprising:
    a baseplate;
    a bumper main body that is constituted of the first steel sheet member of the steel sheet member combination structure and that is joined to the baseplate; and
    a patch member that is constituted of the second steel sheet member of the steel sheet member combination structure and that is joined to at least one of an inner surface or an outer surface of the bumper main body.

9. A door beam having the steel sheet member combination structure according to claim 1, the door beam comprising:
    a door beam main body constituted of the first steel sheet member of the steel sheet member combination structure; and
    a patch member that is constituted of the second steel sheet member of the steel sheet member combination structure and that is joined to at least one of an inner surface or an outer surface of the door beam main body.

10. The steel sheet member combination structure according to claim 2, further comprising:
    a second joint portion that joins together the main wall portion of the first steel sheet member and the horizontal wall portion of the second steel sheet member.

11. The steel sheet member combination structure according to claim 2,
    wherein the second steel sheet member is a steel sheet having a tensile strength of 980 MPa or higher.

12. The steel sheet member combination structure according to claim 3,
    wherein the second steel sheet member is a steel sheet having a tensile strength of 980 MPa or higher.

13. An automotive structural member comprising:
    the sheet member combination structure according to claim 2.

14. An automotive structural member comprising:
    the sheet member combination structure according to claim 3.

15. An automotive structural member comprising:
    the sheet member combination structure according to claim 4.

16. An automotive structural member comprising:
    the sheet member combination structure according to claim 5.

17. A center pillar having the steel sheet member combination structure according to claim 2, the center pillar comprising:
    a center pillar inner;
    a center pillar outer that is constituted of the first steel sheet member of the steel sheet member combination structure and that is joined to the center pillar inner; and
    a patch member that is constituted of the second steel sheet member of the steel sheet member combination structure and that is joined to at least one of an inner surface or an outer surface of the center pillar outer.

18. A center pillar having the steel sheet member combination structure according to claim 3, the center pillar comprising:
    a center pillar inner;
    a center pillar outer that is constituted of the first steel sheet member of the steel sheet member combination structure and that is joined to the center pillar inner; and
    a patch member that is constituted of the second steel sheet member of the steel sheet member combination structure and that is joined to at least one of an inner surface or an outer surface of the center pillar outer.

19. A center pillar having the steel sheet member combination structure according to claim 4, the center pillar comprising:
- a center pillar inner;
- a center pillar outer that is constituted of the first steel sheet member of the steel sheet member combination structure and that is joined to the center pillar inner; and
- a patch member that is constituted of the second steel sheet member of the steel sheet member combination structure and that is joined to at least one of an inner surface or an outer surface of the center pillar outer.

20. A center pillar having the steel sheet member combination structure according to claim 5, the center pillar comprising:
- a center pillar inner;
- a center pillar outer that is constituted of the first steel sheet member of the steel sheet member combination structure and that is joined to the center pillar inner; and
- a patch member that is constituted of the second steel sheet member of the steel sheet member combination structure and that is joined to at least one of an inner surface or an outer surface of the center pillar outer.

* * * * *